United States Patent [19]

Bram

[11] 4,078,813

[45] Mar. 14, 1978

[54] SEALING ELEMENT ADAPTED TO BE RADIALLY COMPRESSED

[75] Inventor: Georges Eugène Bram, Pont-a-Mousson, France

[73] Assignee: Pont-A-Mousson S.A., Nancy, France

[21] Appl. No.: 769,366

[22] Filed: Feb. 16, 1977

[30] Foreign Application Priority Data

Mar. 3, 1976 France .................. 76 05960

[51] Int. Cl.² .................................................. F16J 15/12
[52] U.S. Cl. .................................. 277/207 A; 285/231
[58] Field of Search ............... 285/345, 230, 231, 379; 277/207, DIG. 2

[56] References Cited

U.S. PATENT DOCUMENTS

| | | | |
|---|---|---|---|
| 2,953,398 | 9/1960 | Haugen et al. | 285/231 |
| 2,991,092 | 7/1961 | MacKay | 277/207 |
| 3,236,528 | 2/1966 | Bram | 277/207 |
| 3,362,717 | 1/1968 | Bram | 277/DIG. 2 |
| 3,915,460 | 10/1975 | Kramer | 277/DIG. 2 |

FOREIGN PATENT DOCUMENTS

| | | | |
|---|---|---|---|
| 851,062 | 9/1970 | Canada | 285/231 |
| 1,014,364 | 12/1965 | United Kingdom | 277/DIG. 2 |

*Primary Examiner*—Robert I. Smith
*Attorney, Agent, or Firm*—Sughrue, Rothwell, Mion, Zinn & Macpeak

[57] ABSTRACT

The sealing element comprises an annular active portion of elastomer material adapted to be compressed radially between the outer surface of a male end and the wall of a cylindrical recess in a socket in which the male end extends and means for anchoring the sealing element in the socket, the active portion comprising an outer annular face, an inner annular face and an end face having, when the sealing element is at rest, a minimum inside diameter exceeding the outside diameter of the male end and a maximum outside diameter exceeding said minimum inside diameter by an amount exceeding the radial clearance between the recess and the male end. The end face is connected to each one of the annular faces of the active portion by a circular edge, and, when the sealing element is in the free state, in axial section, the rise or dip of the arc generating the end face is at the most equal to 1/5th of the length of the associated chord.

10 Claims, 3 Drawing Figures

SEALING ELEMENT ADAPTED TO BE RADIALLY COMPRESSED

The present invention relates to sealing elements adapted to be radially compressed for pipes, of the type comprising an annular active portion of elastomer material adapted to be compressed radially between the outer surface of a male end or spigot and the wall of a cylindrical recess formed in a socket or bell into which the male end extends and means for anchoring the sealing element in the socket, the active portion having an outer annular face, an inner annular face and an end face and having, when the sealing element is at rest, a minimum inside diameter exceeding the outside diameter of the male end and a maximum outside diameter which exceeds said minimum inside diameter by an amount exceeding the radial clearance between the recess and the male end.

This type of joint, shown for example in French Patent No. 1,562,486, is easy to assemble and ensures a good seal and has over a period of time a satisfactory performance, at least so long as the fluid conveyed does not have an aggressive action on the elastomer.

On the other hand, when the fluid has an aggressive action, there is observed a destruction of certain parts of the end face of the sealing element which faces the inner end of the socket and is in contact with the fluid, and it seems that all the parts thus destroyed are under tensile stress in service.

It seens that this incapacity of the sealing element to resist the chemical attack is related to the fact that, in the known sealing element of said patent, the end face of the active portion is badly defined and connected to the outer and inner annular faces of this active portion by rounded edges.

An object of the invention is to overcome this drawback and to provide a sealing element for radial compression which is itself capable of resisting the aggressive fluids.

According to the invention, there is provided a sealing element of the aforementioned type, wherein the end face is connected to each one of the annular faces of the active portion by a sharp circular edge and, when the sealing element is in the free state, in axial section, the rise or dip of the arc generating the end face is at the most equal to 1/5th of the length of the associated chord.

Further features and advantages of the invention will be apparent from the ensuing description given merely by way of example with reference to the accompanying drawing, in which.

Figure 1:
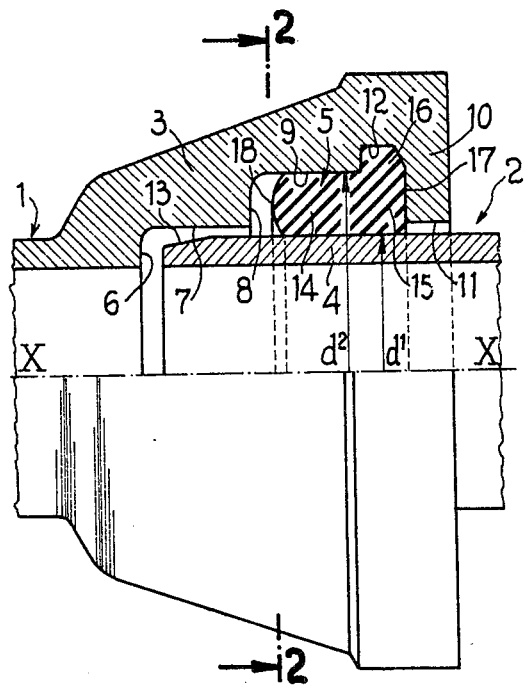
FIG. 1 is a diagrammatic view with a half axial section of a joint between pipes provided with a sealing element according to the invention.
Figure 2:
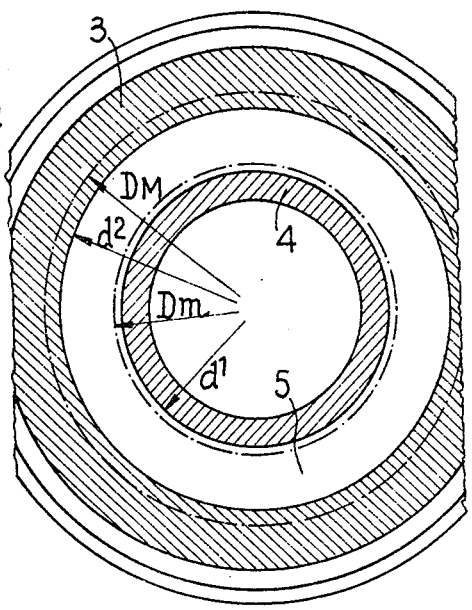
FIG. 2 is a cross-sectional view taken on line 2—2 of FIG. 1.

The joint shown in FIGS. 1 and 2 interconnects two pipe elements or pipes 1 and 2 which are substantially coaxial on an axis X—X. The first pipe 1 terminates in a socket or bell 3 in which there extends the smooth male end or spigot 4 of the second pipe 2. A sealing element 5 of elastomer material is radially compressed between the socket 3 and the male end 4.

Note that in FIGS. 1 and 2, for reasons of clarity, the radial dimensions of the various component parts of the joint have been greatly exaggerated with respect to the diameter of the piping.

The socket 3 has, starting from its inner end 6, a first cylindrical recess 7 having a diameter exceeding the outside diameter of the male end 4, a roughly radial shoulder 8 and a second cylindrical recess 9 having a diameter exceeding the first recess 7 and defined by a radial inner flange 10 which terminates the socket and defines a circular opening 11 whose diameter is substantially equal to the diameter of the recess 7. A cylindrical groove 12, adjacent the flange 10, is formed in the wall of the second recess 9.

The male end 4 has a constant outside diameter and a frustoconical chamfer 13 at its end which is adapted to facilitate its penetration into the socket 3 when assembling the pipe joint.

The sealing element 5, which is in one piece, comprises an active portion 14 which is highly radially compressed between the wall of the second recess 9 of the socket 3 and the outside surface of the male end 4, and an anchoring heel 15 which directly adjoins said active portion 14 and whose radially outer part 16 is received in the groove 12 of the socket. This heel 15 has a radial planar end face 17 which bears against the inner face of the flange 10 and the active portion 14 of the sealing element has a curved convex or cambered end face 18 which is spaced from the inner end 8 of the recess 9 so that the compression of the sealing element is purely radial. In service, this end face 18 is the sole part of the sealing element which is exposed to the fluid conveyed by the pipe.

Figure 3:
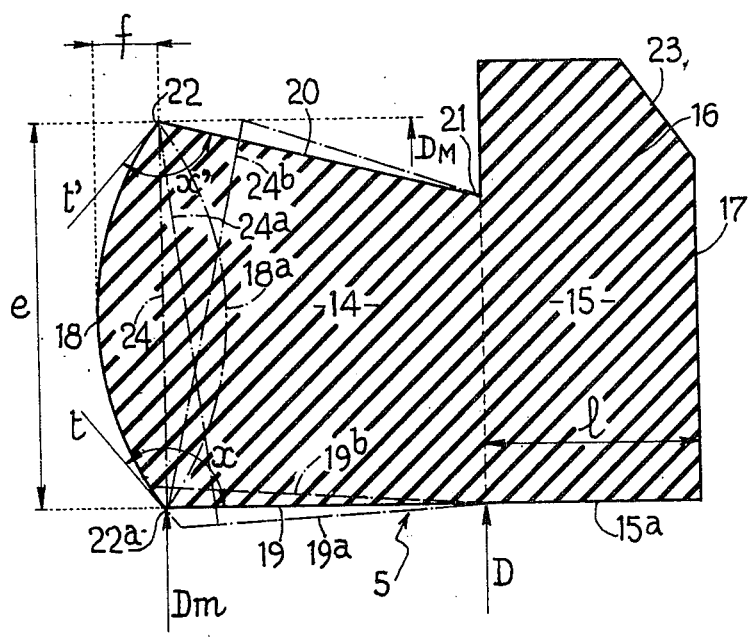
FIG. 3 is a semi-axial sectional view to an enlarged scale of the sealing element in the free state.

FIG. 3 shows the section of the sealing element 5 in the free state. This section has the following geometric characteristics:

The active portion 14 has a cylindrical inner face 19 whose diameter exceeds the outside diameter of the male end 4; its outer face 20 has a frustoconical shape which is convergent toward the entrance of the socket, that is to say, toward the heel 15; the minor diameter of the face 20, at its junction 21 with the anchoring heel 15, is equal to the diameter of the second recess 9 and its major diameter, which is the diameter of a sharp circular edge 22 by which it is connected with the end face 18, exceeds the diameter of the recess 9 by a suitable amount bearing in mind the laws of compression of the elastomer employed.

The end face 18 has substantially the shape of an arc of a circle and is connected to the outer face 20 by the edge 22 and to the inner face 19 by another circular sharp edge 22$^a$.

The section of the heel 15 has, in the free state, the shape of a rectangle whose outer part 16 has a cut-away or chamfered portion 23 so that it can exactly adapt itself to the groove 12 in the socket 3. The outside diameter of the heel 15 and its axial length l are respectively equal to the diameter of the inner end of the groove 12 and the axial dimension of the latter.

The radially inner face 15$^a$ of the heel 15 is directly connected to the face 19 of the active portion 14 and the two diameters are equal. By way of a modification, the inner face of the heel, instead of being cylindrical as shown, may be slightly conical and in this case preferably divergent toward the entrance of the socket so as to facilitate the penetration of the male end into the latter. However, in any case, this inside diameter remains in every respect at least equal to the outside diameter of the male end.

The chord 24 which subtends the arc, which by rotation about the axis X—X, generates the end face 18 of the sealing element 5, that is to say which interconnects the edges 22 and $22^2$, is radial. However, by way of a modification, this chord may be inclined in one direction or the other as shown in dot-dash lines at $24^a$ and $24^b$.

Also by way of a modification, the end face 18 may be planar or frustocoinical, in which case it coincides in section with the corresponding chord or, may be concave as shown in dot-dash line at $18^a$, so as to produce two lips which are adapted to be applied against the recess 9 of the socket and the male end 4 and face the inner end of the socket.

Also by way of a modification, the inner face 19 may be convergent or divergent from the heel 15, for example in a frustoconical manner as shown in dot-dash lines at $19^a$ and $19^b$. The same is true of the outer face 20.

More generally, the active portion 14 of the sealing element may have very various forms and the means for anchoring the sealing element in the socket may be of any type provided that the following four conditions are satisfied:

a. The minimum diameter $D_m$ of its inner face is greater than the outside diameter $d^1$ of the male end, even if this face is frustoconical and is divergent toward the entrance as shown at $19^a$.

b. Its maximum diameter $D_M$ is greater than the diameter $d^2$ of the recess 9 and exceeds the diameter $D_m$ by an amount exceeding $d^2 - d^1$.

c. In the case where the end face 18 is convex or concave, the maximum rise or dip $f$ of this face 18 is in axial section at the most equal to 1/5th of the length $e$ of the associated chord, whether the latter be strictly radial (chord 24) or inclined (chord $24^a$ or $24^b$). The latter condition is of course satisfied when the face 18 is solid since its rise is then zero.

d. In axial section, the face 18 intersects the inner and outer faces and defines sharp corners.

In other words, the three first dimensional relations may be written:

(a) $D_m > d^1$
(b) $D_M - D_m > d^2 - d^1$
(c) $f \leq e/5$

The conditions (a) and (b) are shown in FIG. 2 in which the sealing element in the free state has been shown in dot-dash lines.

It will be understood that the limitation of the magnitude of the rise $f$ imposes a limitation on the angles $x$ and $x'$ made by the faces 19 and 20 and the tangents $t$ and $t'$ to the arc 18 and its ends.

Note that the diameter D of the circle connecting the active portion 14 to the anchoring heel 15 is always greater than $d^1$ since the inner face of the heel has at all points a diameter exceeding the diameter $d^1$. This diameter D is of course equal to the diameter $D_m$ when the face 19 is cylindrical or is divergent from the heel 15 (face $19^b$). In the opposite case (face $19^a$), the diameter $D_m$ is the diameter of the edge $22^a$.

The assembly of a joint such as that described hereinbefore presents no difficulty and is carried out in the conventional manner by introducing, first, the sealing element in its recess in the socket and then causing the male end to enter the socket by way of the sealing element, the heel 15 being hooked in the groove 12.

The sealing of the joint results from the reduction in the radial thickness of the elastomer active portion of the sealing element between its free state and its compressed state. In the presently-described embodiment, this reduction occurs totally on the outside of the sealing element. In order to ensure that this reduction in fact occurs, it will be understood that the difference between $D_M$ and $d^2$ must be sufficient with respect to the difference between $D_m$ and $d^1$. The only part of the sealing element in contact with the conveyed fluid is the end face 18 defined by the two circular edges 22 and $22^a$ which define in a definite manner the elastomer in contact with the two pipes.

It will be observed that such a sealing element has the following property: when the aforementioned four conditions (a), (b), (c) and (d) are satisfied, the radial development of the end face of the sealing element, that is, the length of the corresponding arc in section, exceeds, at rest, its radial development after compression.

The result of this is that, when the sealing element has been assembled, its end face 18 has only points in compression, this both in the circumferential direction and radial direction, and experience has shown that the agents which are normally harmful to the good performance of the elastomer of the sealing element have no action under these conditions. It concerns, for example, agents that certain fluids contain and in particular gases charged with aliphatic and aromatic condensates, and also hydrocarbons, aqueous, plastic, acid or saline solutions. This important advantage is obtained with no modification of the pipes or of their manner of assembly and with no addition of auxiliary elements to conventional joints.

Having now described my invention what I claim as new and desire to secure by Letters Patent is:

1. A sealing element for combination with a pipe joint between a pipe male end and a pipe socket having a cylindrical recess, said element comprising an annular active portion of elastomer material adapted to be compressed radially between an outer surface of the male end and a wall of the cylindrical recess in the socket in which socket the male end extends, and means for anchoring the sealing element in the socket, the active portion comprising an outer annular face, an inner annular face and an end face and having, when the sealing element is uncompressed and at rest, a minor inside diameter exceeding the outside diameter of the male end and a major outside diameter exceeding said minor inside diameter by an amount exceeding the radial clearance between the recess and the male end, said end face being generated by an arc and connected to each one of said annular faces of the active portion by a circular edge, and, when the sealing element is in said free state and is viewed in axial section, the distance between the arc and a chord of the arc intersecting said two circular edges and subtending the arc being at the most equal to 1/5th of the length of said chord.

2. A sealing element as claimed in claim 1, wherein said chord is radial.

3. A sealing element as claimed in claim 1, wherein said chord is inclined with respect to the radial direction.

4. A sealing element as claimed in claim 1, wherein said arc is coincident with said chord.

5. A sealing element as claimed in claim 1, wherein said end face is cambered.

6. A sealing element as claimed in claim 1, wherein said end face is concave and defines two lips.

7. A sealing element as claimed in claim 1, wherein said active portion has, in section, a generally trapezium shape.

8. A sealing element as claimed in claim 1, wherein said anchoring means comprise an anchoring heel for engagement with a groove in the socket, said heel being directly adjacent said active portion.

9. A sealing element as claimed in claim 8, wherein an outer face of said active portion is frusto-conical and divergent from the anchoring heel.

10. A sealing element as claimed in claim 8, wherein the heel has a radially inner face which is connected to the face of said active portion, a minimum inside diameter of the heel exceeding the outside diameter of the male end.

* * * * *